Oct. 8, 1968

H. SCHONFELD 3,404,448

APPARATUS FOR ASSEMBLY OF UNIVERSAL JOINTS INDEPENDENT
OF THE POSITION OF THE PRESSURE APPLYING MEANS

Filed Nov. 16, 1966

Inventor:
HARALD SCHÖNFELD
BY
Hammond and Littell
ATTORNEYS 3,404,448
APPARATUS FOR ASSEMBLY OF UNIVERSAL JOINTS INDEPENDENT OF THE POSITION OF THE PRESSURE APPLYING MEANS
Harald Schonfeld, Herzogenaurach, Germany, assignor to Industriewerk Schaeffler OHG, Herzogenaurach, Germany, a corporation of Germany
Filed Nov. 16, 1966, Ser. No. 594,834
Claims priority, application Germany, Dec. 10, 1965,
J 29,563
5 Claims. (Cl. 29—252)

ABSTRACT OF THE DISCLOSURE

An improved apparatus for assembling universal joints formed by the connection of two shafts forked at their ends with a universal joint spider and having radially and axially loadable bearings arranged in bores in the shaft forks for accommodating the spider trunnions independent of the position of the pressure applying means.

Prior art

Universal joints are used to provide a pivotable connection between two rotating shafts and are particularly required in large numbers in the automotive industry. Therefore, attempts have been made to mechanize the assembly of universal joints as much as possible to keep the assembly costs as low as posisble. However, special care has to be taken to align the axes of the shafts to be connected with the utmost accuracy because even slight inaccuracies, particularly at high speeds of rotation, will become noticeable by the resulting imbalance resulting in considerable disadvantages.

Commonly assigned U.S. Patent No. 3,230,617 describes an apparatus which accommodates the two shafts to be connected in a fashion to guarantee that the two shafts are accurately aligned. The bearing may be pressed into the bore by a ram connected to a device which produces the pressing-in force and is displaceable relative to the fork arm in the axial direction of the bore. Between the said device and the fork arm, there are holding means for transmitting the reaction force. Owing to the transmission of the pressing-in force to the fork arm, the latter is acted upon from one side by the pressing-in force and from the other side by the equally great reaction force. Therefore, there is an equilibrium of forces and displacement of the fork arm is impossible.

However, the use of the said holding means requires that the pressure applying device be spaced at a specific distance from the fork arm depending upon the length of the holding means. Tolerances in the fork arm thickness require that the position of the pressure applying device be changed from one case to the next. Therefore, the pressure producing device must be moveably disposed in a bore axial direction with respect to the fork arm.

In many cases of assembling universal joints, it is desirable that the bearing under pre-load abut against a corresponding surface of the spider trunnion. To accomplish this, the fork arms in the said U.S. Patent are spread apart to a predetermined degree in a direction opposite to the pressing-in direction after the bearings have been pressed in until they abut in free-play motion against the spider trunnions. The pressure applying device accordingly will move opposite to the pressing-in direction to the same degree that the fork arms are spread apart and abutment means is provided to limit this movement. To attain an always constant degree of expansion of the fork arms, this abutment means has to be spaced each time at the same distance from the pressure applying device, independent from the respective position of the pressure applying device in relation to the universal joint, prior to the pressing-in of the bearings and the subsequent spreading of the fork arms. In the said U.S. Patent, this is achieved by part of the abutment means also being shiftable in a bore axial direction, but assuming a fixed position during the spreading apart of the fork arms in regard to the center of the universal joint.

The abutment means in the said U.S. Patent is composed of a wedge moveable at right angles to the direction of the pressure applying means which abuts against a correspondingly inclined wedge surface on the pressure applying device. This wedge surface is moveable in the direction opposite to the pressure applying device to the degree that the fork arms are to be spread apart.

It is an object of the invention to provide an improved apparatus for assembling universal joints in which the pressure applying means is moveable a predetermined degree opposite to the pressing-in direction.

This and other objects and advantages of the invention will become obvious from the following detailed description.

The invention

The apparatus of the invention for assembling universal joints formed by the connection of two shafts forked at their ends with a universal joint spider and having radially and axially loadable bearings arranged in bores in the shaft forks for accommodating the spider trunnions is comprised of means for centering the spider trunnions in the bores of the shaft forks, a ram means for pressing in and/or securing the bearing in the bore of the shaft fork connected to pressure applying means to produce the pressing-in force and displaceable relative to the fork arm in bore-axial direction, means for transmitting reaction forces between the pressure applying means and the fork arm and adjustable abutment means to limit the displacement travel of the pressure applying means opposite to the pressing-in direction, the pressure applying means, independent of its position at any time in relation to the universal joint, cooperates with an element to form an abutment means whereby the movement of the pressure applying means to a predetermined degree opposite to the pressing-in direction is possible.

In a further embodiment of the invention, the pressure applying means is connected to an element which is also moveable in a bore-axial direction relative to the fork arm and is capable of being locked in any desired position whereby the pressure applying means is moveable a predetermined degree in relation to this element.

Another advantageous characteristic of the invention comprises disposing a spring means having a spring force less than the pressing-in force between the pressure applying means and the said cooperating element whereby the said element is spaced from the pressure applying device at a distance corresponding to the predetermined degree of movability.

Finally, another characteristic of the invention comprises providing a fixed element for producing forces acting at right angles to the movement direction of the said element for arresting the said element, which effects a force actuated connection between the fixed element and the said element. The fixed element producing the forces which act at right angles to the direction of movement of the said element, may consist of wedge-like members slidable with respect to each other and surround the said element.

Referring now to the drawings.

Figure 1:
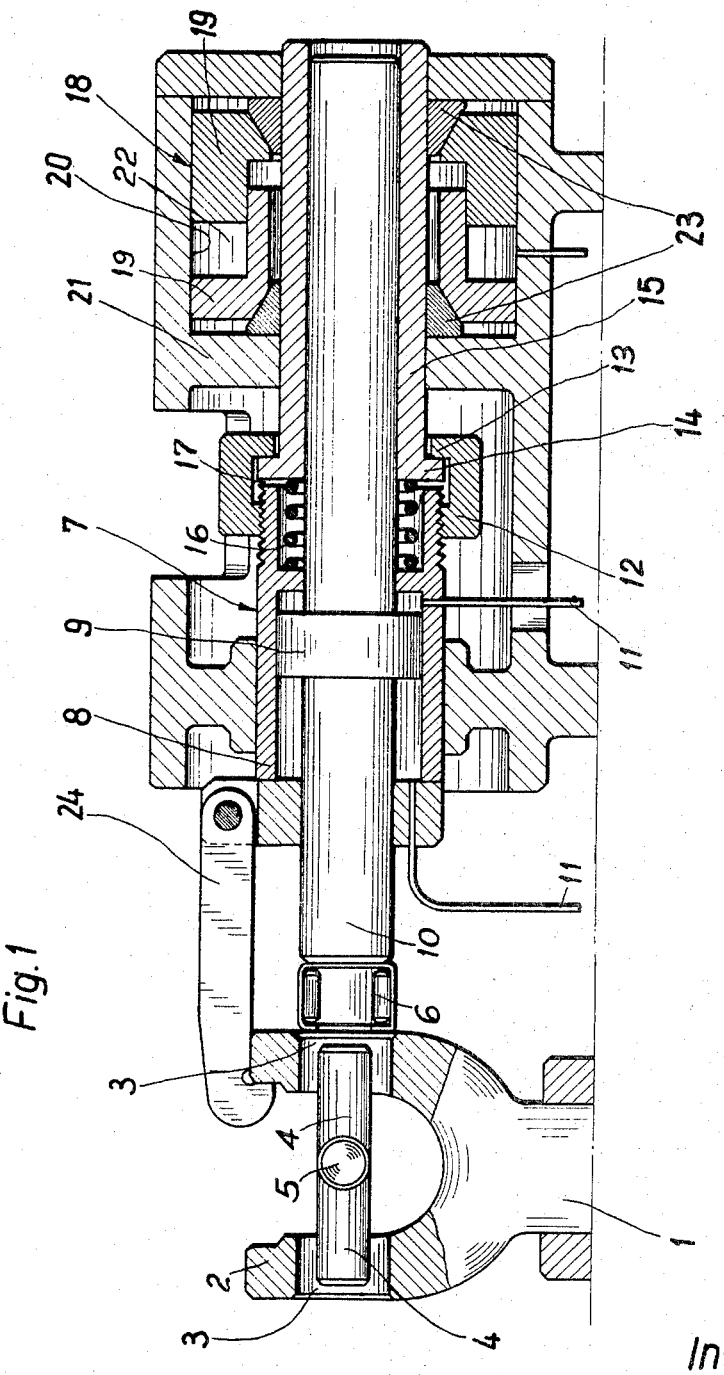
FIG. 1 is a cross-sectional view of one apparatus embodiment of the invention just prior to the pressing in of the bearing.
Figure 2:
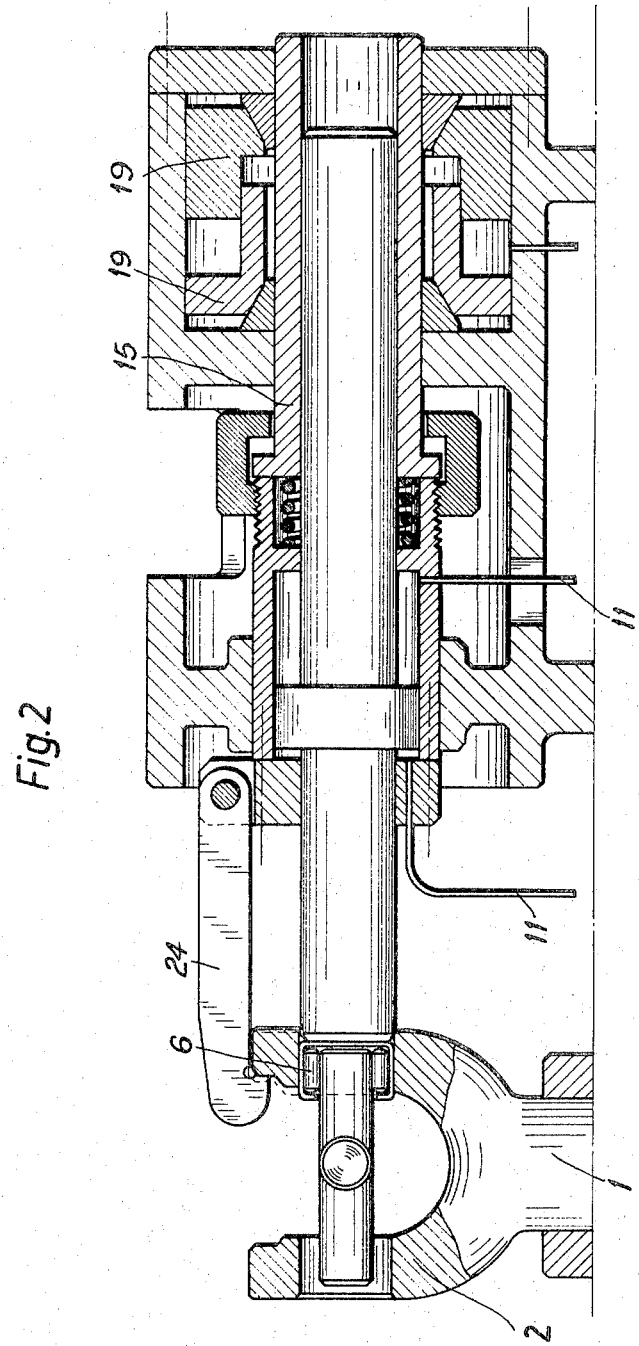
FIG. 2 is a cross-sectional view of the apparatus of FIG. 1 during the widening of the fork arm.

In FIGS. 1 and 2, one shaft 1 of the two shafts to be connected by a universal joint has fork arms 2 having bores 3 therein. Two opposed trunnions 4 of the joint spider 5 extend into bores 3 of fork arms 2 and each trunnion 4 is to be accepted in a radially and axially loadable bearing 6. A pressure applying device 7 is provided to press in the bearing 6 which device consists of a cylinder 8, a piston 9 and a ram 10. Piston 9 is disposed in cylinder 8 and is moveable in the axial direction of the fork arm bores 3. Oil under pressure is fed into the cylindrical chambers in front of and behind piston 9 through oil conduits 11. Pressure applying device 7 is connected on the side away from the universal joint to threaded member 12 which is provided with a collar 13 which collar encloses flange 14 of element 15. Element 15 is also moveable in a bore axial direction and a spring element 16 is disposed between element 15 and pressure applying device 7 which forces them apart and holds them at spaced distance 17. Distance 17 can be varied by rotating member 12 by a screw thread to pressure applying device 7. The moveability of element 15 in the bore-axial direction is arrested by element 18 which produces forces at right angles to the bore axis. Element 18 is comprised of two pistons 19 of wedge-like section which are slidable with respect to each other and are mounted in a cylindrical bore 20 of casing 21. The space 22 between the two pistons 19 may, for example, be filled with a hydraulic fluid under pressure which presses the two pistons 19 of wedge-like section against clamping rings 23 of corresponding wedge-like section which develops a force at right angles to the bore axis whereby element 15 is securely clamped to casing 21.

Prior to the pressing of bearings 6 into the fork arm bores 3, holding clips 24 are secured to the fork arm 2 thereby connecting the said fork arm with the pressure applying device 7 to accept the reaction force. After the bearing 6 has been pressed into the fork arm bore 3 until it abuts without play against the spider trunnion 4, the fork arm 2 by maintaining the pressing-in force, is widened by the holding clip 24, opposite to the pressing-in direction, to an amount which corresponds to the distance 17 between pressure applying device 7 and flange 14. In this position the bearings are then fixedly secured in well known manner by suitable means in their present location with respect to the fork arm bore. After removal of holding clips 24, a pre-load occurs between the bearing 6 and the corresponding abutment surface of the spider trunnion 4, as the fork arm strains to return to its original position.

With the apparatus of the invention, it is possible to assemble universal joints with variable measurements without necessitating the reconstruction of the entire apparatus. Also, tolerances in fork arm thickness can be equalized in a simple manner and the amount of preload is identical in all universal joints. This is made possible by the fact that the pressure applying device, together with the element forming the abutment means, may assume any desired position with respect to the universal joint center. However, independent of its position at any time, an effective locking of the element 15 with respect to the universal joint center is possible without this locking action producing any force which could have an unfavorable effect on the widening process.

Various modifications of the apparatus of the invention may be made without departing from the spirit or scope thereof and it is to be understood that the invention is to be limited only as defined in the appended claims.

I claim:
1. An apparatus for assembling universal joints formed by the connection of two shafts forked at their ends with a universal joint spider and having radially and axially loadable bearings arranged in bores in the shaft forks for accommodating the spider trunnions comprising a ram means for pressing in and/or securing a bearing with the bore of the shaft fork connected to pressure applying means to produce the pressing-in force and displaceable relative to the fork arm in bore-axial direction, means for transmitting reaction forces between the pressure applying means and the fork arm and adjustable abutment means to limit the displacement travel of the pressure applying means opposite to the pressing-in direction, the pressure applying means in any position at any time in relation to the universal joint, cooperates with an element to form an abutment means and which is also moveable in a bore axial direction relative to the fork arm and is capable of being locked in any desired position whereby the pressure applying means is moveable in relation to this element a distance equal to and opposite to the pressing-in direction.

2. An apparatus of claim 1 wherein a spring means is disposed between the pressure applying means and the cooperating element whereby the said element is spaced from the pressure applying device at a distance corresponding to the distance of moveability.

3. An apparatus of claim 2 wherein the spring force of the spring means is less than the pressing-in force.

4. An apparatus of claim 1 wherein the means for locking the cooperating element is a fixedly secured element producing forces acting at right angles to the direction of movement of said element which produces a forced actuated connection between the cooperating element and the fixed element.

5. An apparatus of claim 4 wherein the said fixed element is comprised of wedge-like members slidable with respect to each other and surrounding the cooperating element.

References Cited
UNITED STATES PATENTS

| 2,020,162 | 11/1935 | Rodgers | 29—252 X |
| 3,008,226 | 11/1961 | Kellerman | 29—201 |
| 3,102,333 | 9/1963 | Thornton et al. | 29—257 |
| 3,230,617 | 1/1966 | Spiess et al. | 29—434 |

MYRON C. KRUSE, *Primary Examiner.*